(12) United States Patent
Hayden

(10) Patent No.: US 8,903,772 B1
(45) Date of Patent: Dec. 2, 2014

(54) DIRECT OR INDIRECT MAPPING POLICY FOR DATA BLOCKS OF A FILE IN A FILE SYSTEM

(75) Inventor: John M. Hayden, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 1974 days.

(21) Appl. No.: 11/924,576

(22) Filed: Oct. 25, 2007

(51) Int. Cl.
*G06F 7/00* (2006.01)

(52) U.S. Cl.
USPC .......................................... 707/649; 711/162

(58) Field of Classification Search
USPC .................... 711/4, 170, 162; 707/3
See application file for complete search history.

(56) References Cited

U.S. PATENT DOCUMENTS

| | | | |
|---|---|---|---|
| 5,893,140 A | 4/1999 | Vahalia et al. | |
| 6,324,581 B1 | 11/2001 | Xu et al. | |
| 6,341,333 B1 | 1/2002 | Schreiber et al. | |
| 6,499,039 B1 | 12/2002 | Venkatesh et al. | |
| 6,711,649 B1 | 3/2004 | Bachmat et al. | |
| 6,714,949 B1 | 3/2004 | Frey, Jr. | |
| 6,766,416 B2 | 7/2004 | Bachmat | |
| 6,775,679 B2 | 8/2004 | Gupta | |
| 6,904,470 B1 | 6/2005 | Ofer et al. | |
| 6,938,039 B1 | 8/2005 | Bober et al. | |
| 6,973,455 B1 | 12/2005 | Vahalia et al. | |
| 6,976,134 B1 | 12/2005 | Lolayekar et al. | |
| 6,985,914 B2 | 1/2006 | Venkatesh et al. | |
| 7,024,427 B2 | 4/2006 | Bobbitt et al. | |
| 7,107,385 B2 * | 9/2006 | Rajan et al. | 711/4 |
| 7,165,158 B1 | 1/2007 | Yagawa | |
| 7,424,497 B1 * | 9/2008 | Leverett et al. | 1/1 |
| 7,676,514 B2 * | 3/2010 | Faibish et al. | 707/646 |
| 2004/0030668 A1 | 2/2004 | Pawlowski et al. | |
| 2004/0030822 A1 * | 2/2004 | Rajan et al. | 711/4 |
| 2004/0059822 A1 | 3/2004 | Jiang et al. | |
| 2005/0044162 A1 | 2/2005 | Liang et al. | |
| 2005/0065986 A1 | 3/2005 | Bixby et al. | |
| 2005/0066095 A1 | 3/2005 | Mullick et al. | |
| 2005/0246382 A1 * | 11/2005 | Edwards | 707/200 |
| 2006/0075191 A1 | 4/2006 | Lolayekar et al. | |
| 2006/0212746 A1 | 9/2006 | Amegadzie et al. | |
| 2007/0136548 A1 | 6/2007 | Mane | |
| 2007/0179990 A1 | 8/2007 | Zimran et al. | |

(Continued)

OTHER PUBLICATIONS

Uresh Vahalia, Unix Internals: The New Frontiers, 1996, p. 261-289 and 338-371, Prentice-Hall, Inc., Upper Saddle River, NJ.

(Continued)

*Primary Examiner* — Sherief Badawi
*Assistant Examiner* — Christopher J Raab
(74) *Attorney, Agent, or Firm* — Deepika Bhayana; Krishnendu Gupta

(57) ABSTRACT

A file is initially created to have metadata and a data block allocation for direct mapping without access to any indirect blocks. Therefore file access performance is increased because the direct mapping eliminates delay otherwise caused by fetching one or more indirect blocks. When needed, the functionality enabled by indirect mapping is provided by creating an indirect mapping for the file and then accessing the file using the indirect mapping. When the functionality enabled by the indirect mapping is no longer needed, the file is reorganized to a direct mapping and then accessed using the direct mapping. For example, a container file for a network attached SCSI LUN is created and accessed without a performance degradation until conversion to an indirect mapping occurs automatically and seamlessly upon activation of a supplementary storage service such as a file-based snapshot copy and replication facility.

6 Claims, 12 Drawing Sheets

(56) References Cited

U.S. PATENT DOCUMENTS

2007/0260842 A1* 11/2007 Faibish et al. .................. 711/170
2007/0266056 A1   11/2007 Stacey et al.
2008/0082589 A1*  4/2008 English et al. ................. 707/203

OTHER PUBLICATIONS

Bill Nowicki, Network Working Group, RFC 1094, "NFS: Network File System Protocol Specification," Mar. 1989, 27 pages, Sun Microsystems Inc., Santa Clara, CA.
S. Shepler et al., "Network File System (NFS) Version 4 Protocol," Network Working Group, Request for Comments: 3530, Apr. 2003, 275 pages, The Internet Society, Reston, VA.
Paul J. Leach and Dilip C. Naik, "A Common Internet File System (CIFS/1.0) Protocol," Network Working Group, Internet Engineering Task Force, Dec. 19, 1997, 121 pages, The Internet Society, Reston, VA.
J. Satran et al., "Internet Small Computer Systems Interface (iSCSI)," Network Working Group, Request for Comments: 3720, Apr. 2004, 257 pages, The Internet Society, Reston, VA.
"Celerra File Server Architecture for High Availability," Aug. 1999, 11 pages, EMC Corporation, Hopkinton, MA.
"Enginuity: The Symmetrix Storage Operating Environment," EMC White Paper, 2005, 22 pages, EMC Corporation, Hopkinton, MA.
EMC Symmetrix DMX Architecture, Product Description Guide, 2004, 76 pages, EMC Corporation, Hopkinton, MA.
"Celerra Data Migration Service (CDMS)," White Paper, Jan. 2002, 14 pages, EMC Corporation, Hopkinton, MA.
"Information Lifecycle Management: An Automated Approach," Technical White Paper, Dec. 8, 2003, 20 pages, EMC Corporation, Hopkinton, MA.
"Automated Resource Management," Technology Brief—Aug. 2002, 3 pages, The Enterprise Storage Group, Milford, MA.
W. Rickard et al., "Shared Storage Model—A framework for describing storage architectures," SNIA Technical Council, snia.org, Apr. 13, 2003, 41 pages, Storage Networking Industry Association.
S. Kang and A. Reddy, Virtual Allocation: A scheme for flexible storage allocation, Proc. of OASIS workshop in conjunction with ASPLOS, Oct. 2004, 5 pages, Association for Computing Machinery, New York, NY.
"ReiserFS," printed Dec. 7, 2005, 55 pages, namesys.com, Oakland, CA.
S. Sikand and R. March, "Highly Scalable High Performance Perforce Server Environments," Perforce User Conference, May 2003, 12 pages, Las Vegas, NV.
Menon et al., "IBM Storage Tank—a heterogeneous scalable SAN file system," IBM Systems Journal, vol. 42, No. 2, 2003, pp. 250-267, IBM Corp., Armonk, NY.
Alan Radding, "ATA/SATA drives fitting bigger niches," Storage Networking World Online, Mar. 8, 2004, 3 pages, Computerworld, Framingham, MA.
David Reine, "EMC Takes the Next Step—Moves Multi-Tiering Inside Symmetrix," The Clipper Group Navigator, Aug. 18, 2005, 5 pages, Clipper Group Inc., Wellesley, MA.
Juan I Santos Florido, "Journal File Systems," Linux Gazette, Jul. 2000, Issue 55, 11 pages, Seattle, WA.
Figueirendo et al., "The Punch Virtual File System: Seamless Access to Decentralized Storage Services in a Computational Grid," Tenth IEEE International Symposium on High Performance Distributed Computing, Aug. 7-9, 2001, San Francisco, 11 pages, IEEE, Piscataway, NJ.

* cited by examiner

DIRECT OR INDIRECT MAPPING POLICY FOR DATA BLOCKS OF A FILE IN A FILE SYSTEM

FIELD OF THE INVENTION

The present invention relates generally to data processing machines, and more specifically to programming of a file server for management of a file system.

BACKGROUND OF THE INVENTION

Network data storage is most economically provided by an array of low-cost disk drives integrated with a large semiconductor cache memory. A number of data mover computers are used to interface the cached disk array to the network. The data mover computers perform file locking management and mapping of the network files to logical block addresses of storage in the cached disk array, and move data between network clients and the storage in the cached disk array. See, for example, Vahalia et al. U.S. Pat. No. 5,893,140 issued Apr. 6, 1999, entitled "File Server Having a File System Cache and Protocol for Truly Safe Asynchronous Writes," incorporated herein by reference.

Typically the logical block addresses of storage are subdivided into logical volumes. Each logical volume is mapped to the physical storage using a respective striping and redundancy scheme. The data mover computers typically use the Network File System (NFS) protocol to receive file access commands from clients using the UNIX (Trademark) operating system or the LINUX (Trademark) operating system, and the data mover computers use the Common Internet File System (CIFS) protocol to receive file access commands from clients using the MicroSoft (MS) WINDOWS (Trademark) operating system. The NFS protocol is described in "NFS: Network File System Protocol Specification," Network Working Group, Request for Comments: 1094, Sun Microsystems, Inc., Santa Clara, Calif., March 1989, 27 pages, and in S. Shepler et al., "Network File System (NFS) Version 4 Protocol," Network Working Group, Request for Comments: 3530, The Internet Society, Reston, Va., April 2003, 262 pages. The CIFS protocol is described in Paul J. Leach and Dilip C. Naik, "A Common Internet File System (CIFS/1.0) Protocol," Network Working Group, Internet Engineering Task Force, The Internet Society, Reston, Va., Dec. 19, 1997, 121 pages.

The data mover computers may also be programmed to provide clients with network block services in accordance with the Internet Small Computer Systems Interface (iSCSI) protocol, also known as SCSI over IP. The iSCSI protocol is described in J. Satran et al., "Internet Small Computer Systems Interface (iSCSI)," Network Working Group, Request for Comments: 3720, The Internet Society, Reston, Va., April 2004, 240 pages. The data mover computers use a network block services protocol in a configuration process in order to export to the clients logical volumes of network attached storage, which become local pseudo-disk instances. See, for example, Jiang et al., Patent Application Publication US 2004/0059822 A1 published Mar. 25, 2004, entitled "Network Block Services for Client Access of Network-Attached Storage in an IP Network," incorporated herein by reference.

A storage object such as a virtual disk drive or a raw logical volume can be contained in a file compatible with the UNIX (Trademark) operating system so that the storage object can be exported using the NFS or CIFS protocol and shared among the clients. In this case, the storage object can be replicated and backed up using conventional file replication and backup facilities without disruption of client access to the storage object. See, for example, Liang et al., Patent Application Publication US 2005/0044162 A1 published Feb. 24, 2005, entitled "Multi-Protocol Sharable Virtual Storage Objects," incorporated herein by reference. The container file can be a sparse file. As data is written to a sparse file, the size of the file can grow up to a pre-specified maximum number of blocks, and the maximum block size can then be extended by moving the end-of-file (eof). See, for example, Bixby et al., Patent Application Publication US 2005/0065986 A1 published Mar. 24, 2005, entitled "Maintenance of a File Version Set Including Read-Only and Read-Write Snapshot Copies of a Production File," incorporated herein by reference, and Mullick et al., Patent Application Publication 2005/0066095 A1 published Mar. 24, 2005, entitled "Multi-Threaded Write Interface and Methods for Increasing the Single File Read and Write Throughput of a File Server," incorporated herein by reference.

SUMMARY OF THE INVENTION

It has been observed that when using the network block services protocol to access a SCSI LUN contained in a UNIX-based container file system, there is often a performance degradation in comparison to access of a network attached SCSI LUN that is not contained in a container file system. This performance degradation is caused by a mapping overhead incurred when management of the container file system does a lookup of the address of the data block associated with a specified offset in the SCSI LUN and this lookup requires the fetching of an indirect metadata block in the disk block hierarchy of the file containing the SCSI LUN. This mapping overhead has been tolerated as a characteristic of a UNIX file system that permits each data block to be allocated from any convenient location on disk. This characteristic of a UNIX file system supports sparse files and possible sharing of specified data blocks between files for enabling "write somewhere else" snapshot copies, and de-duplication of specified data blocks. Nevertheless, it is desired to eliminate this mapping overhead for a file containing a network-attached SCSI LUN or any other file that sometimes might not need each data block to be allocated from any convenient location on disk.

In accordance with one aspect, the invention provides a method of operating a file server for read or write access to data of a file. The file includes multiple data blocks containing data of the file, and the file further includes an inode containing metadata of the file. The method includes reading or writing to the file when the file is organized in a direct mapping state in which a logical extent of the file is mapped to the multiple data blocks of the file without access to any indirect block of the file. The method further includes converting the file from the direct mapping state to an indirect mapping state by converting the mapping information for the file in the direct mapping state to mapping information for the file in the indirect mapping state. The mapping information for the file in the indirect mapping state includes at least one indirect block of the file. The method further includes reading or writing to the file once the file has been converted from the direct mapping state to the indirect mapping state by accessing the at least one indirect block to obtain mapping information for reading data from or writing data to at least one of the data blocks of the file.

In accordance with another aspect, the invention provides a method of operating a file server for read or write access to data of a file. The file includes multiple data blocks containing data of the file. The file further includes an inode containing metadata of the file. The method includes reading or writing to the file when the file is in an indirect mapping state by accessing at least one indirect block of the file to obtain mapping information for reading data from or writing data to at least one of the data blocks of the file. The method also includes converting the file in the indirect mapping state to a direct mapping state in which the logical extent of the file is mapped to the multiple data blocks of the file without access to any indirect block of the file. The file in the indirect mapping state is converted to the direct mapping state by reorganizing the data blocks of the file in the indirect mapping state. The method further includes reading or writing to the file when the file is organized in the direct mapping state in which the logical extent of the file is mapped to the multiple data blocks of the file without access to any indirect block of the file.

In accordance with another aspect, the invention provides a file server. The file server includes data storage for storing a file system, and at least one data processor coupled to the data storage for providing a client with access to at least one file in the file system. The file includes multiple data blocks containing data of the file. The file further includes an inode containing metadata of the file. The at least one data processor is programmed for reading or writing to the file when the file is organized in a direct mapping state in which a logical extent of the file is mapped to the multiple data blocks of the file without access to any indirect block of the file. The at least one data processor is further programmed for converting the file from the direct mapping state to an indirect mapping state by converting the mapping information for the file in the direct mapping state to mapping information for the file in the indirect mapping state. The mapping information for the file in the indirect mapping state includes at least one indirect block of the file. The at least data processor is further programmed for reading or writing to the file once the file has been converted from the direct mapping state to the indirect mapping state by accessing the at least one indirect block to obtain mapping information for reading data from or writing data to at least one of the data blocks of the file.

BRIEF DESCRIPTION OF THE DRAWINGS

Additional features and advantages of the invention will be described below with reference to the drawings, in which.

Figure 1:
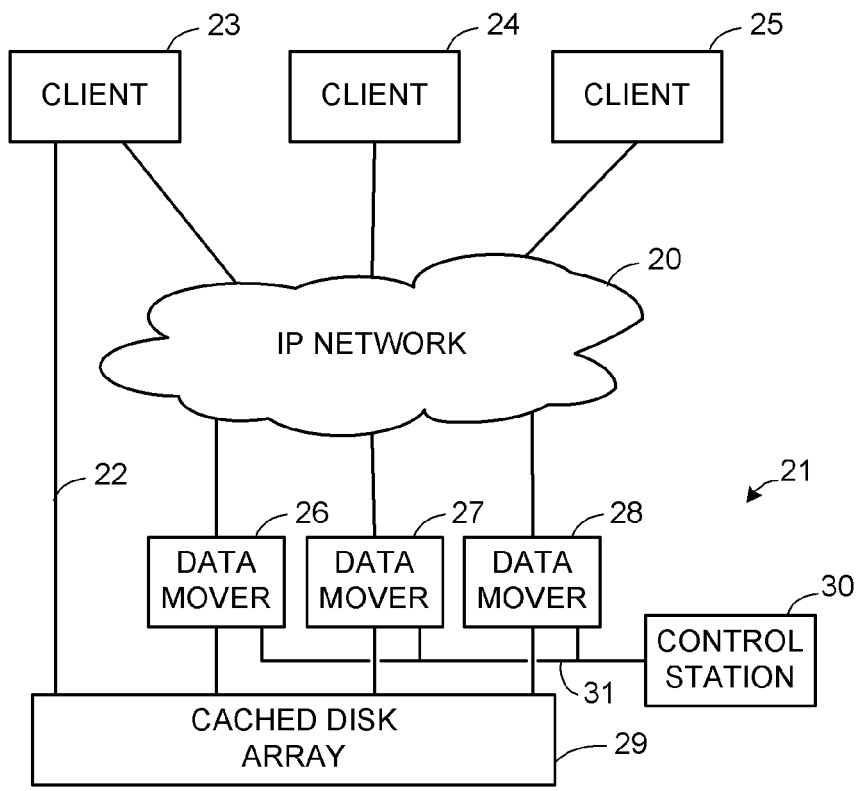
FIG. 1 is a block diagram of a network file server incorporating a direct/indirect mapping facility in accordance with the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

FIG. 1 shows an Internet Protocol (IP) network 20 including a multi-protocol network file server 21 and multiple clients 23, 24, 25. The network file server 21, for example, has multiple data mover computers 26, 27, 28 for moving data between the IP network 20 and a cached disk array 29. The network file server 21 also has a control station 30 connected via a dedicated dual-redundant data link 31 among the data movers for configuring the data movers and the cached disk array 29.

Further details regarding the network file server 21 are found in Vahalia et al., U.S. Pat. No. 5,893,140, incorporated herein by reference, and Xu et al., U.S. Pat. No. 6,324,581, issued Nov. 27, 2001, incorporated herein by reference. The network file server 21 is managed as a dedicated network appliance, integrated with popular network operating systems in a way, which, other than its superior performance, is transparent to the end user. The clustering of the data movers 26, 27, and 28 as a front end to the cached disk array 29 provides parallelism and scalability. Each of the data movers 26, 27, 28 is a high-end commodity computer, providing the highest performance appropriate for a data mover at the lowest cost. The data mover computers 26, 27, 28 may communicate with the other network devices using standard file access protocols such as the Network File System (NFS) or the Common Internet File System (CIFS) protocols, but the data mover computers do not necessarily employ standard operating systems. For example, the network file server 21 is programmed with a UNIX-based file system that has been adapted for rapid file access and streaming of data between the cached disk array 29 and the data network 20 by any one of the data mover computers 26, 27, 28.

Figure 2:
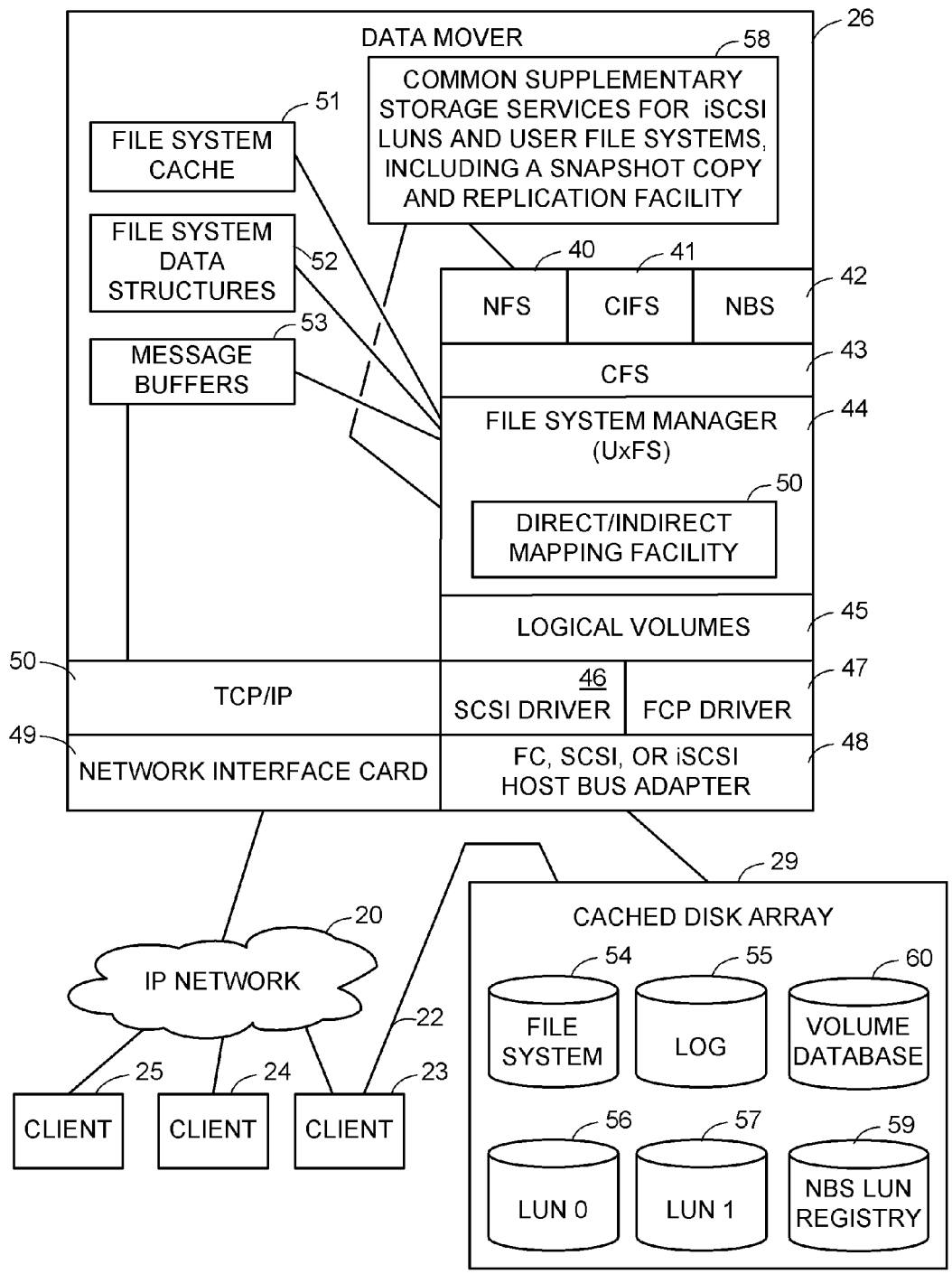
FIG. 2 is a block diagram showing details of a data mover and a cached disk array introduced in FIG. 1.

FIG. 2 shows software modules in the data mover 26 introduced in FIG. 1. The data mover has a Network File System (NFS) module 40 for supporting communication among the clients and data movers of FIG. 1 over the IP network 20 using the NFS file access protocol, and a Common Internet File System (CIFS) module 41 for supporting communication over the IP network using the CIFS file access protocol. The data mover 26 also has a network block services (NBS) module 42 for exporting to the clients logical volumes 56, 57 of network attached storage in the cached disk array 29. These logical volumes 56, 57 then become pseudo-disk instances that appear local to the clients. The clients may then use the Internet Small Computer Systems Interface (iSCSI) protocol with the data mover 26 to access these logical volumes as iSCSI logical unit number (LUNs), as further described in Jiang et al., Patent Application Publication US 2004/0059822 A1 published Mar. 25, 2004, incorporated herein by reference. The NBS module has a LUN registry 59 in storage to provide a mapping of a (target, LUN) specifier in a client request to the logical storage address of the LUN 56, 57 in the cached disk array.

The NFS module 40, the CIFS module 41, and the NBS module 42 are layered over a Common File System (CFS) module 43, and the CFS module is layered over a Universal File System (UxFS) module 44. The UxFS module 44 functions as a manger for managing UNIX-based file systems. The CFS module 43 provides higher-level functions common to NFS, CIFS, and NBS. The UxFS module 44 is layered over a logical volumes module 45. The logical volumes module 45 provides a respective metavolume of storage of the cached disk array 29 for each UNIX-based file system. The metavolumes are defined by configuration information stored in a volume database 60 in the cached disk array 29. The logical volumes module 45 is layered over a SCSI driver 46 and a Fibre-channel protocol (FCP) driver 47 in order to access logical storage in the cached disk array 29. The data mover 26 sends storage access requests through a host bus adapter 48 using the SCSI protocol, the iSCSI protocol, or the Fibre-Channel protocol, depending on the physical link between the data mover 26 and the cached disk array 29.

A network interface card 49 in the data mover 26 receives IP data packets from the IP network 20. A TCP/IP module 50 decodes data from the IP data packets for the TCP connection and stores the data in message buffers 53. For example, the UxFS layer 44 writes data from the message buffers 53 to a file system 54 in the cached disk array 29. The UxFS layer 44 also reads data from the file system 54 or a file system cache 51 and copies the data into the message buffers 53 for transmission to the network clients 23, 24, 25.

To maintain the file system 54 in a consistent state during concurrent writes to a file, the UxFS layer 44 maintains file system data structures 52 in random access memory of the data mover 26. To enable recovery of the file system 54 to a consistent state after a system crash, the UxFS layer 44 writes file metadata to a log 55 in the cached disk array during the commit of certain write operations to the file system 54.

The network file server also provides metadata services to the client 23 so that the client may perform read and write operations directly to the cached disk array 29 over a data link 22. For example, as described in Vahalia et al. U.S. Pat. No. 6,973,455 issued Dec. 6, 2005, incorporated herein by reference, the client 23 sends to the file server 21 at least one request for access to a file. In response, the file server 21 grants a lock to the client 23, and returns to the client metadata of the file including information specifying data storage locations in the cached disk array 29 for storing data of the file. The client 23 receives the metadata, and uses the metadata to produce at least one data access command for accessing the data storage locations in the cached disk array 29. The client sends the data access command to the cached disk array 29 to read or write data to the file. For a write operation, the client 23 may modify the metadata. When the client 23 is finished writing to the file, the client returns any modified metadata to the network file server.

The network file server also provides common supplementary storage services 58 for iSCSI LUNs and user file systems, including a snapshot copy and replication facility, and other services for backup, recovery, and information lifecycle management (ILM). By containing the storage of each iSCSI LUN in the logical extent of a respective file, it is possible to use the same programs for backup, recovery, and ILM of files or iSCSI LUNs. Thus, the common supplementary storage services 58 may use the NFS module 40 for access to container file systems for iSCSI LUNs in a conventional fashion.

It has been observed that when using the network block services protocol 42 to access a SCSI LUN contained in a UNIX-based container file system 54, there is often a performance degradation in comparison to access of a network attached SCSI LUN 56, 57 that is not contained in a container file system. This performance degradation is caused by a mapping overhead incurred when management of the container file system does a lookup of the address of the data block associated with a specified offset in the SCSI LUN and this lookup requires the fetching of an indirect metadata block in the disk block hierarchy of the file containing the SCSI LUN. This mapping overhead has been tolerated as a characteristic of a UNIX file system that permits each data block to be allocated from any convenient location on disk. This characteristic of a UNIX file system supports sparse files and possible sharing of specified data blocks between files for enabling "write somewhere else" snapshot copies, and de-duplication of specified data blocks. Nevertheless, it is desired to eliminate this mapping overhead for a file containing a network-attached SCSI LUN or any other file that sometimes might not need each data block to be allocated from any convenient location on disk.

Figure 3:
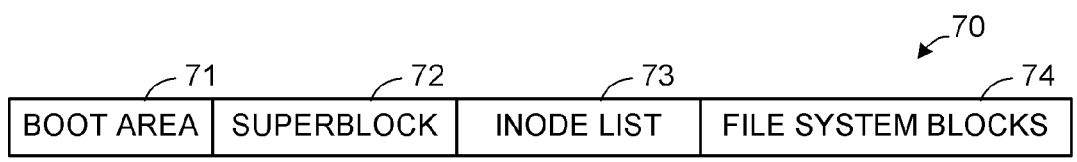
FIG. 3 is a block diagram of a UNIX-based file system in data storage.

The conventional organization and management of a UNIX-based file system is described in Uresh Vahalia, *Unix Internals—The New Frontiers*, Chapter 9, File System Implementations, pp. 261-290, Prentice-Hall, Inc., Upper Saddle River, N.J. (1996). As shown in FIG. 3, the on-disk layout of a file system 70 includes a boot area 71, a superblock 72, an inode list 73, and file system blocks 74. The boot area 71 may contain code for booting an operating system. The superblock 72 contains attributes and metadata of the file system itself.

The inode list 73 is a linear array of inodes. There is one inode for each file in the file system. Each inode can be identified by its inode number, which equals its index in the inode list. Several inodes may fit into one of the file system blocks 74. The inode number can be easily translated into a block number and an offset of the inode from the start of the block. Each inode contains metadata of the file. (See Vahalia, page 263.) Some of the file system blocks 74 are data blocks, and other file system blocks may be indirect blocks, as described below with reference to FIG. 4, or free blocks that have not yet been allocated to any file in the file system.

Figure 4:
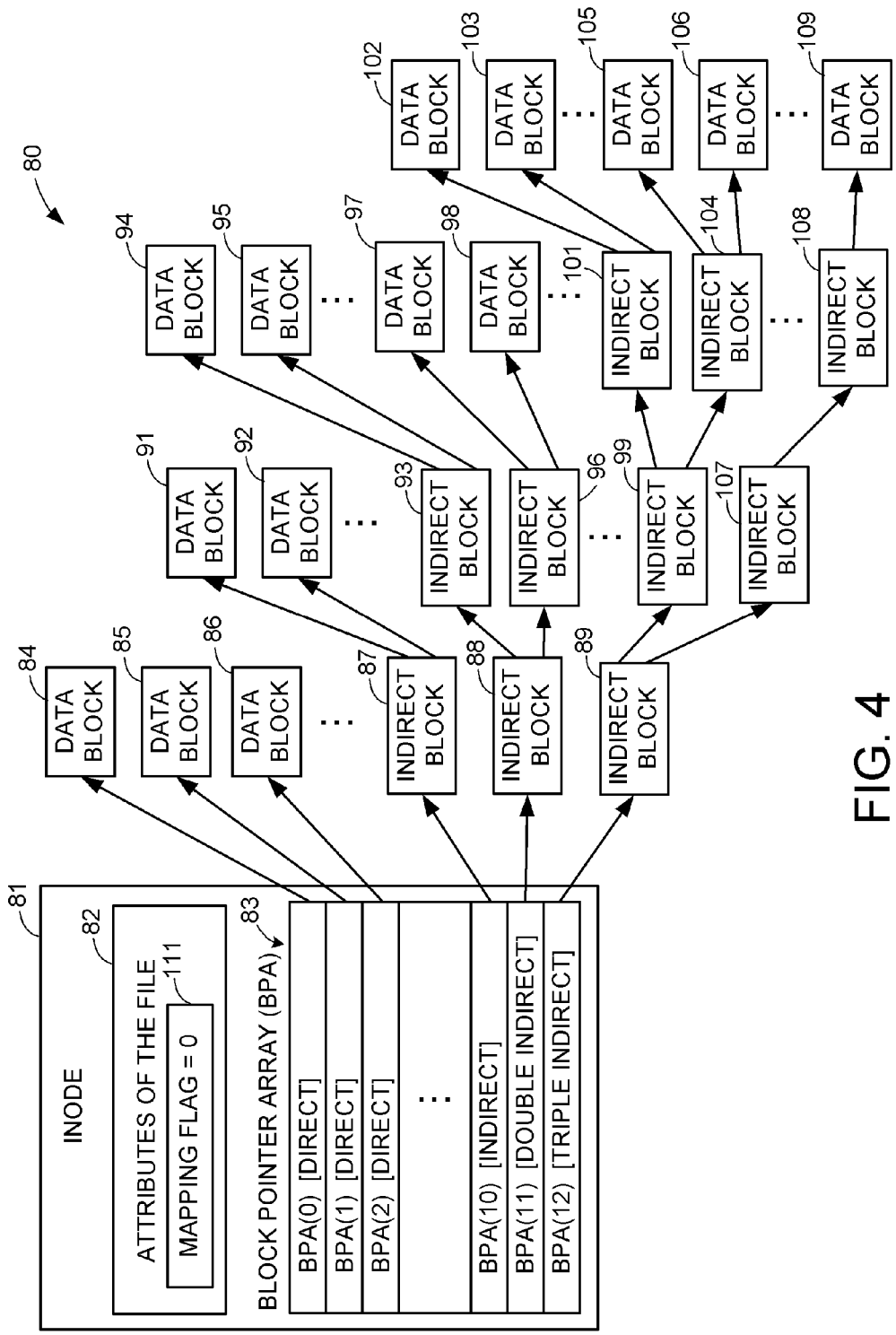
FIG. 4 is a block diagram of a file using the indirect mapping of the UNIX-based file system for mapping data blocks of the file to the logical extent of the file.

FIG. 4 shows a file 80 using the indirect mapping of the UNIX-based file system. The file 80 includes an inode 81 containing attributes 82 of the file, and a block pointer array 83. The block pointer array 83 has thirteen block pointer array entries having respective values BPA(0) to BPA(12). The first of up to ten entries BPA(0) to BPA(9) directly point to the first of up to ten data blocks 84, 85, 86, etc. of the file 80. (See Vahalia, FIG. 9-4, page 265.)

If the file 80 contains more than ten data blocks, then the eleventh entry of the block pointer array 83 contains an indirect block pointer BPA(10) pointing to an indirect block 87 containing pointers to one or more additional data blocks 91, 92, etc. If the file 80 contains so many data blocks that the indirect block 87 becomes full of block pointers, then the twelfth entry of the block pointer array 83 contains a double indirect block pointer BPA(11) to an indirect block 88 that itself points to an indirect block 93 that points to one or more additional data blocks 94, 95, etc. If the file 80 is so large that the indirect block 93 becomes full of block pointers, then the indirect block 88 will point to at least one more indirect block 96 that points to one or more additional data blocks 97, 98, etc.

If the file 80 is so large that the indirect block 88 becomes full of block pointers and its descendant indirect blocks are also full of block pointers, then the thirteenth entry of the block pointer array 83 contains a triple indirect block pointer BPA(12) to an indirect block 89 that points to an indirect block 99 that points to an indirect block 101 that points to one or more additional data blocks 102, 103, etc. If the file is so large that the indirect block 101 becomes full of pointers, then the indirect block 99 points to another indirect block 104 that points to one or more data blocks 105, 10, etc. If the file is so large that the indirect block 99 and its descendant indirect blocks are also full of pointers, then the indirect block 89 points to another indirect block 107 that points to yet another indirect block 108 that points to at least one data block 109, and so on. Once the indirect block 89 and its descendant indirect blocks become full of pointers, the file contains a maximum permitted number of data blocks.

In accordance with an aspect of the present invention, the data block mapping protocol of a file is selectable between a direct mapping protocol that does not uses mapping information stored in any indirect block of the file, and an indirect mapping protocol that uses mapping information stored in at least one indirect block of the file. Thus, at any given time, a file is either in a direct mapping state or an indirect mapping state. In the direct mapping state, once the inode for a file is fetched from storage, a pointer to a specified data block in the logical extent of the file is computed by execution of a computer program without accessing mapping information from any indirect block of the file. In the indirect mapping state, computation of a pointer to a specified block in the logical extent of the file may require information read from an indirect block of the file.

In a preferred indirect mapping protocol, such as the conventional indirect mapping protocol of a UNIX-based file system, the indirect mapping protocol permits any free block of the file system to be allocated to a file of the file system and mapped to any logical block of the logical extent of the file. This unrestricted mapping ability of the conventional indirect mapping protocol of a UNIX-based file system is a result of the fact that the metadata for each file includes a respective pointer to each data block of the file.

Thus, when the file is in the direct mapping state, data access performance is improved relative to data access performance of the indirect mapping state, because the direct mapping state ensures that once the inode of the file has been fetched from storage, there will be no need to fetch any indirect block of the file from storage in order to compute a pointer to the data block for a specified logical block in the logical extent of the file. Data access performance is especially important for network attached storage.

When the file is in the indirect mapping state, flexibility of file system block allocation to the file is improved relative to the direct mapping state, because the use of at least one indirect block provides additional information for a more flexible allocation of file system blocks to the file. The additional flexibility of file system block allocation permits more efficient storage utilization by reducing storage fragmentation and permitting sparse files and efficient dynamic extension of files. In addition, the flexibility of allocating any free file system block to any logical block in the logical extent of a file permits supplementary storage services such as snapshot copy and de-duplication in which any data block in a file system can be freely shared among files of the file system.

Often applications such as network attached storage do not require dynamic allocation or supplementary storage services such as snapshot copy and de-duplication. Therefore, it is advantageous to provide a way of switching the data block mapping for a file in a UNIX-based file system between a direct mapping protocol and the conventional indirect mapping protocol of the UNIX-based file system.

In FIG. 4, the attributes 82 of the file 80 include a mapping flag 111 set to zero to indicate that the file is in the indirect mapping state.

Figure 5:
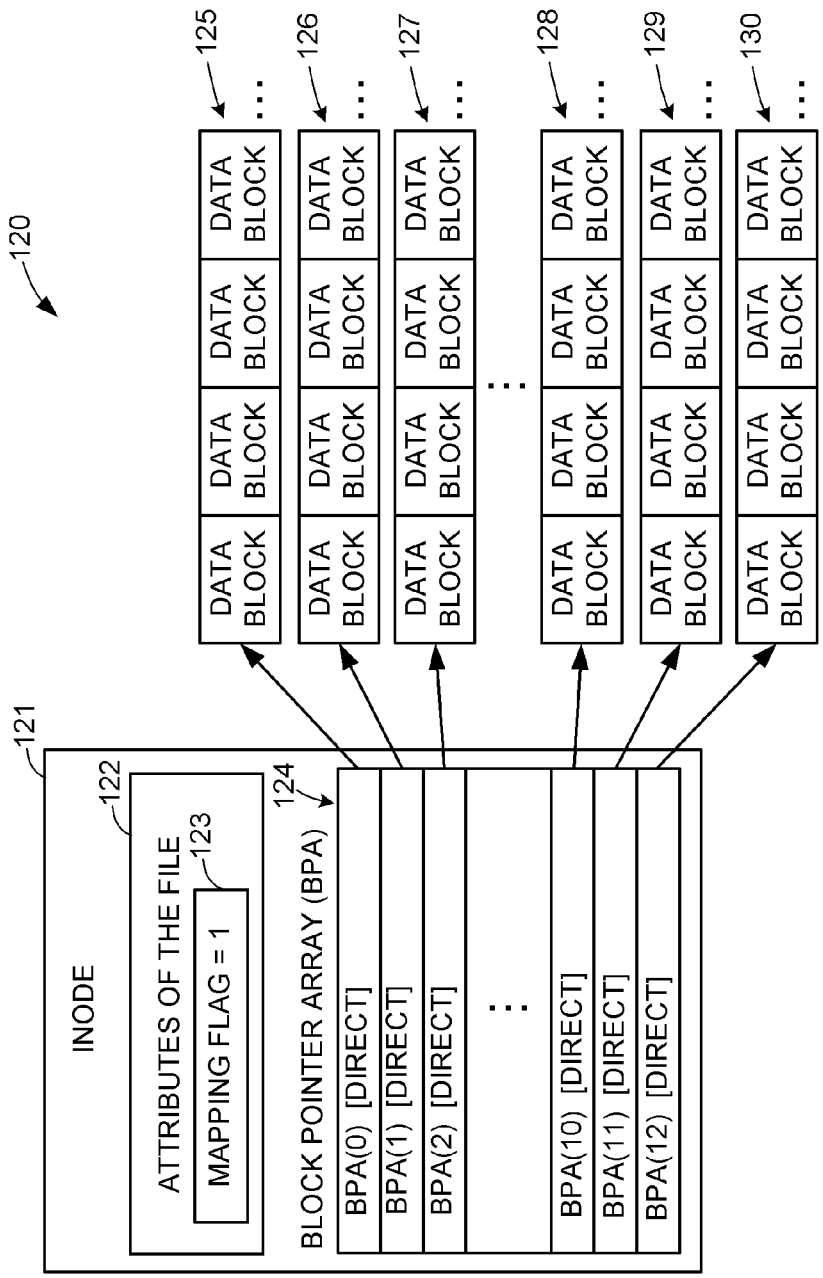
FIG. 5 is a block diagram of a file using a direct mapping policy for mapping data blocks of the file to the logical extent of the file.

FIG. 5 shows a file 120 in a direct mapping state. The inode 121 of the file 120 includes attributes 122 of the file, and a block pointer array 124. The attributes 122 include a mapping flag set to one to indicate that the file 120 is in the direct mapping state. The logical extent of the file is comprised consecutively of up to thirteen extents 125, 126, 127, ..., 128, 129, 130 of contiguous file system data blocks. Each of the extents of contiguous file system data blocks is pointed to by a corresponding block pointer BPA(0) to BPA(12) in the block pointer array 124. For example, the number of data blocks in each of the extents 125 to 130 is a predetermined function of the size of the file.

In a specific example, if a direct mapped file is to have data blocks allocated to all the logical blocks in its extent when the file is created, then each of the extents 125 to 130 has the same number of data blocks. Programming for this example will be described further below with reference to FIGS. 7 and 8. Alternatively, only the first extent 125 is allocated to the file when the file is created, and the additional extents 126 to 130 are allocated on an as-needed basis if and when data is written to the file. In this alternative, for certain file types, such as a log file, the extent size increases as the additional extents are added. For example, the second extent 126 has twice the number of data blocks as the first extent 125, the third extent 127 has twice the number of data blocks as the second extent 126, and so on.

In general, it is practical for each file to have a different direct allocation policy, because for a direct mapped file, any kind of parameters or program code defining the direct allocation policy for the file can be stored in the memory or storage of the inode that is otherwise used for storing the block pointer array when the file is in the indirect mapping state. In addition, a particular one of multiple predefined mapping policy routines could be selected based on file attributes (such as file size, read-write, read-only, temporary, or retention protected), or based on the file type as specified by a file name extension.

Figure 6:
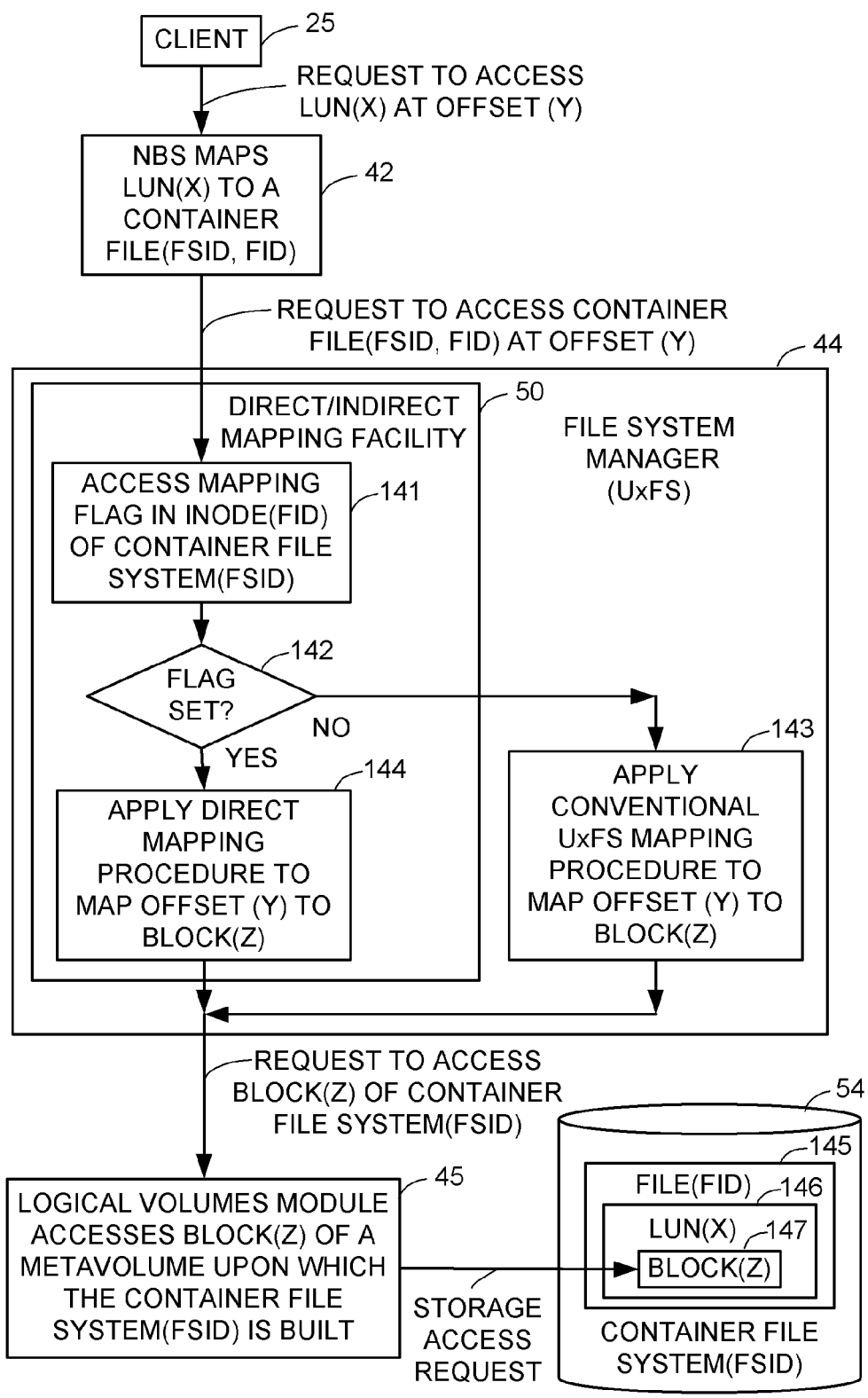
FIG. 6 is a flow diagram showing operation of the direct/indirect mapping facility in the network file server of FIG. 1.

FIG. 6 shows control flow during operation of the direct/indirect mapping facility 50 in the network file server of FIG. 1. In this example, the client 25 sends to the network file server a request for read or write access to a specified SCSI LUN(x) at a specified offset (y). The network file server directs this request to the NBS module 42. The NBS module 42 maps the LUN(x) to a container file identified by a file system ID (FSID) and a file ID (FID). Then the NBS module 42 sends a corresponding read or write request to the UxFS file system manager 44 to access the container file (identified by the file handle (FSID, FID)) at the specified offset (y) in the logical extent of the container file. This request is intercepted by the direct/indirect mapping facility 50.

The direct/indirect mapping facility 50 uses the file handle (FSID, FID) to find the container file system specified by the FSID and the inode that is indexed in the container file system by the FID. Then the direct/indirect mapping facility 50 reads the mapping flag in the inode of the container file system. If this flag is not set, as tested at junction 142, then the direct/indirect mapping facility 50 invokes a UNIX routine 143 to apply the conventional UxFS mapping procedure to map the specified offset (y) to a particular data block (z) in the container file system. If the mapping flag is set, as tested at the junction 142, then the direct/indirect mapping facility 50 invokes a direct mapping procedure 144 to map the specified offset (y) to a particular data block (z) in the container file system.

The UxFS file system manager 44 sends a corresponding read or write request to access the block (z) of a metavolume upon which the container file system is built. In other words, the logical volumes module 45 maps the file system ID (FSID) to a metavolume of storage (using volume configuration information in the volume database 60 in FIG. 1) to produce a corresponding read or write storage access request. The logical volumes module 45 sends the storage access request to the on-disk container file system 54 in storage of the cached disk array (29 in FIG. 1) in order to access block(z) 147 in the LUN(x) 146 of the file 145.

Figure 7:
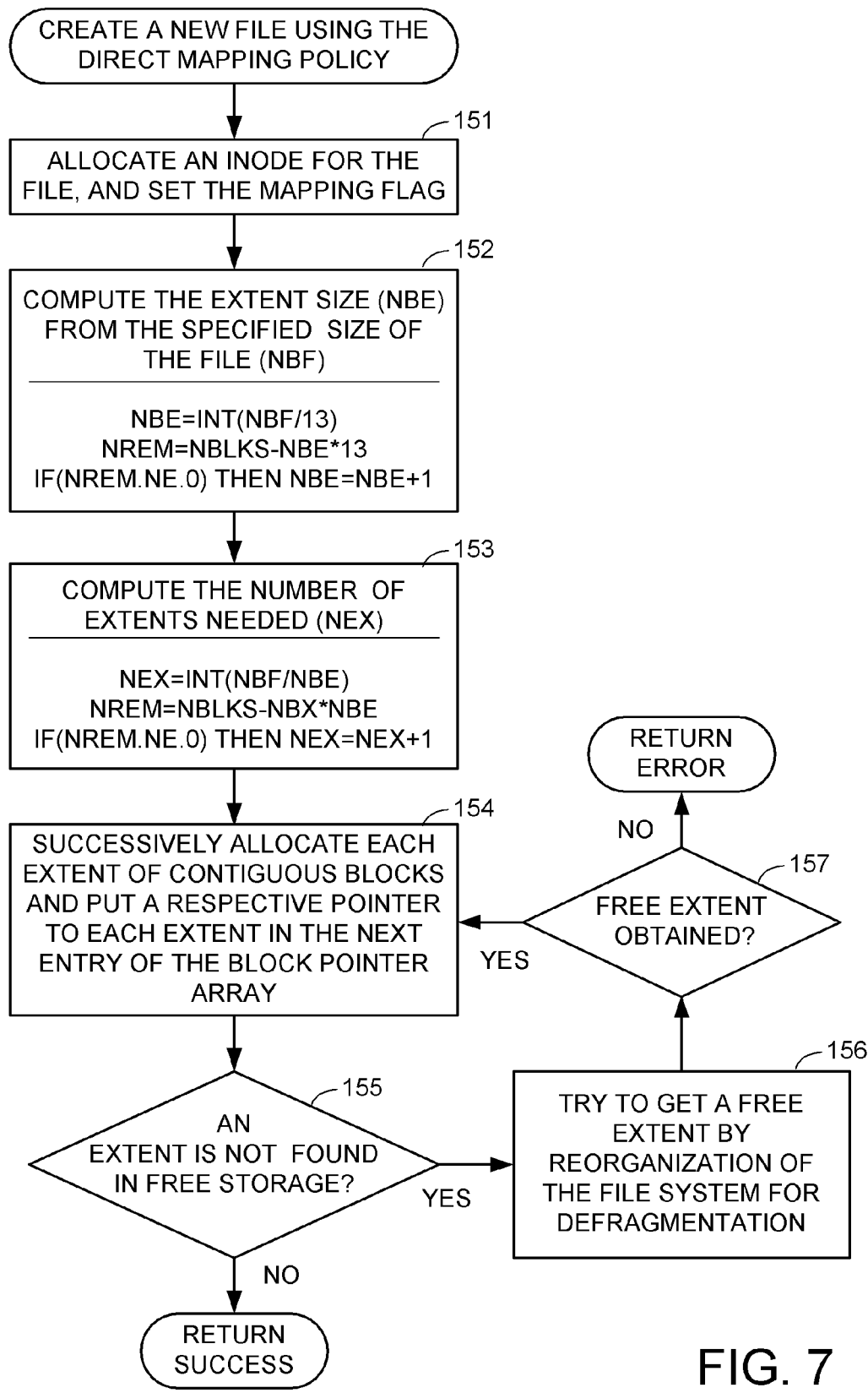
FIG. 7 is a flowchart of a subroutine of the direct/indirect mapping facility for creating a new file using the direct mapping introduced in FIG. 5.

FIG. 7 shows a subroutine of the direct/indirect mapping facility (50 in FIG. 2) for creating a new file using the direct mapping policy introduced in FIG. 5. In this direct mapping policy, the logical extent of the file is mapped to up to thirteen successive extents of contiguous file system blocks, and each of these extents of contiguous file system blocks has the same number of data blocks. In a first step 151, an inode for the file is allocated, the mapping flag is set in this inode. In step 152, the number of data blocks (NBE) in each extent of allocated blocks is computed from the specified size (NBF) of the file. This is done by an integer division of the specified size of the file in data blocks (NBF) by thirteen (the number of entries in the block pointer array), and increasing this quotient by one if the remainder of the division is not zero. In step 153, the number of extents needed (NEX) is computed. This is done by dividing the specified size of the file in data blocks by the number of data blocks in each extent (NBE), and increasing the quotient by one if the remainder of the division is not zero.

In step 154, each of the (NEX) extents of contiguous file system blocks are allocated, and a respective pointer to each extent (beginning with the first pointer BPA(0)) is put in the block pointer array in the inode. In step 155, if such an extent of contiguous file system blocks is not found in the free storage of the file system, then execution branches to step 146, in an attempt to get a free extent by reorganization of the file system for defragmentation. If this is not possible (for example because the total number of free file system blocks is less than the number of blocks (NBE) in each extent), then an error is returned with an indication that there is insufficient free storage in the file system to create the new file. Otherwise, execution loops back to step 154 to continue the successive allocation of extents of contiguous blocks to the file. Once all of the (NEX) extents have been allocated and respective pointers to them have been loaded into the block pointer array, execution returns with an indication that the new file has been created.

Figure 8:
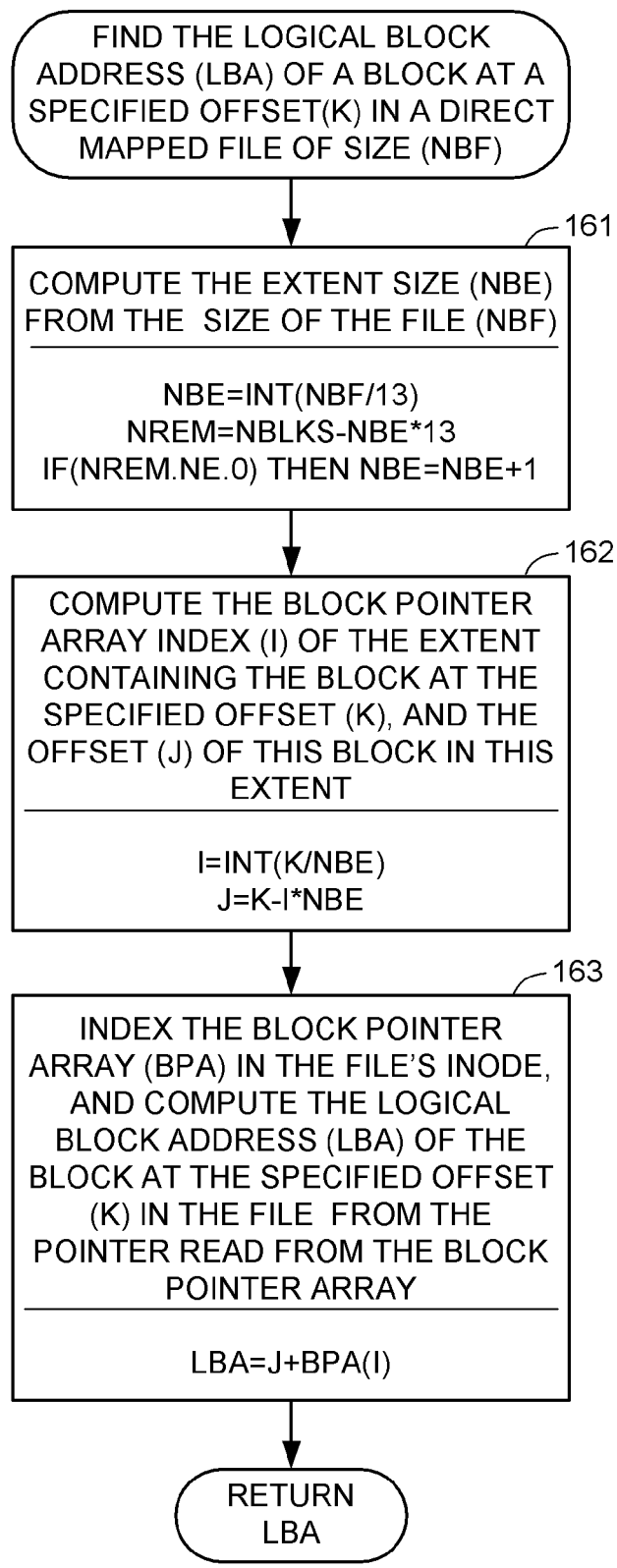
FIG. 8 is a flowchart of a subroutine of the direct/indirect mapping facility for finding the logical block address of a block at a specified offset in a direct mapped file using the direct mapping introduced in FIG. 5.

FIG. 8 shows a subroutine of the direct/indirect mapping facility for finding the logical block address (LBA) of a block at a specified offset (K) in a direct mapped file of size (NBF) using the direct mapping policy of FIG. 5 In a first step 161, the extent size (NBE) is computed from the size of the file (NBF), again by an integer division of the number of data blocks in the file (NBF) by thirteen, and increasing the quotient by one if the remainder is not zero. In step 162, the block pointer array index (I) is computed for the extent containing the block at the specified offset (K). This is done by an integer division of the specified offset (K) by the number of blocks (NBE) in each extent. Also, in step 162, an offset (J) is computed of the specified block in this extent, by computing the difference between the offset (K) and the product of the block pointer index (I) and the number of blocks in each extent (NBE). In step 163, the block pointer array in the file's inode is indexed (with the index I), and the logical block address (LBA) of the block at the specified offset (K) in the file is computed from the pointer BPA(I) read from the block pointer array, by adding the offset (J) in the extent to the pointer BPA(I). After step 153, execution returns with the computed logical block address (LBA).

Figure 9:
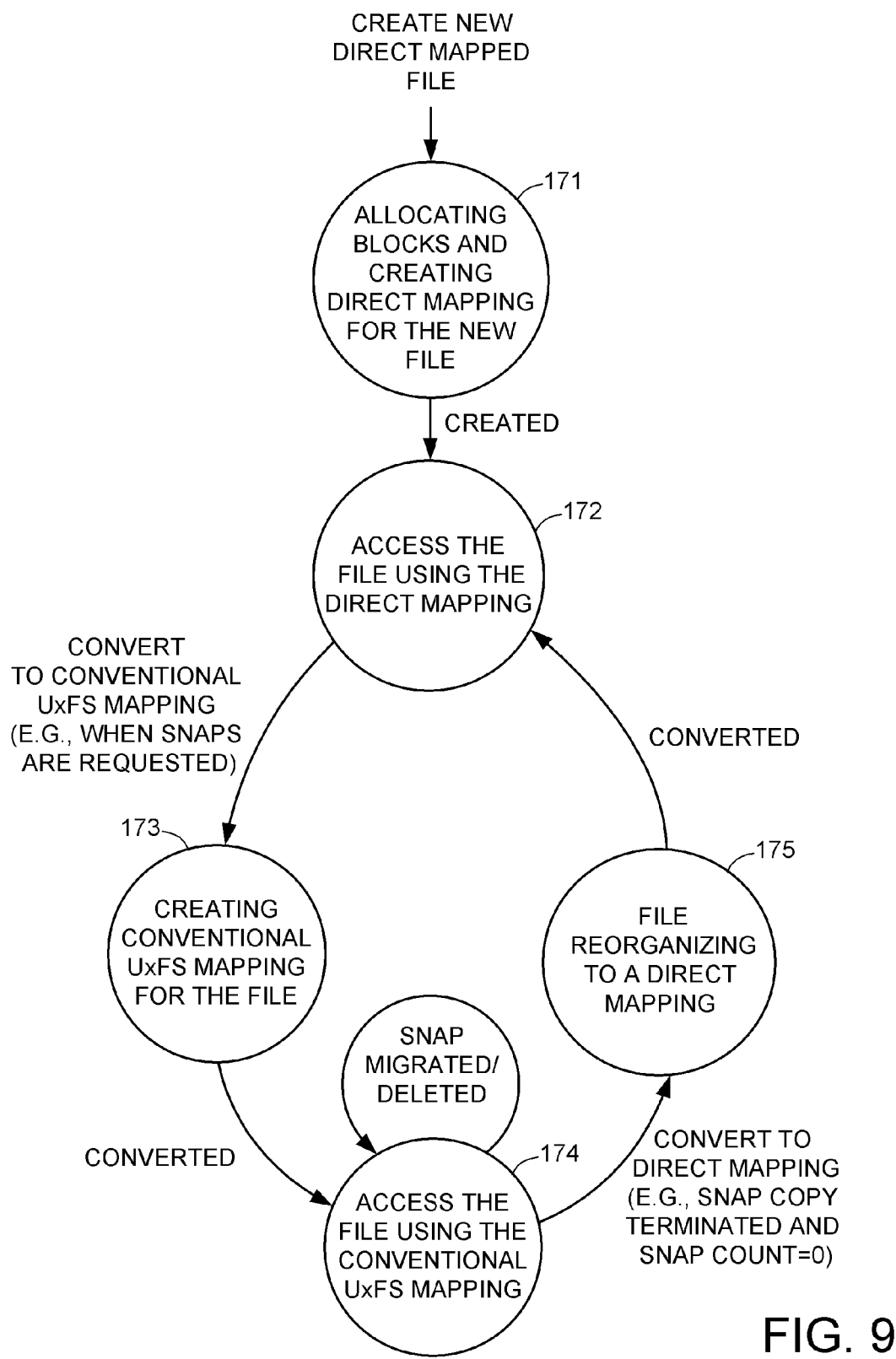
FIG. 9 is a state diagram of a file that is created as a direct mapped file, and then converted to use the indirect mapping of the UNIX-based file system, and then reorganized to again use the direct mapping.

FIG. 9 is a state diagram of a file that is created as a direct mapped file, and then converted to the indirect mapping of the UNIX-based file system, and then reorganized to again use the direct mapping. A request to create a new direct mapped file puts the new file into an initial state 171 of allocating file system blocks and creating the direct mapping for the new file. Once the new file has been created, the file is in a state 172 in which the new file is accessed by clients or applications using the direct mapping. In response to a request from a client or application to convert the direct mapping to the conventional UxFS mapping, the file transitions to an intermediate state 173 of creating a conventional UxFS mapping for the file. For example, when the snapshot copy and replication facility of the supplementary storage services is requested to replicate snapshot copies of a file that is in the direct mapping state, the snapshot copy facility requests the direct/indirect mapping facility to convert the direct mapping of the file to the conventional UxFS mapping.

Once the conventional UxFS mapping has been created, the file transitions to a state 174 in which the file is accessed by clients or applications using the conventional UxFS mapping. These applications may change the mapping for particular offsets in the logical extent of the file so that the data blocks of the file no longer comprise a limited number of extents of contiguous data blocks. For example, in this state, any number of snapshot copies are made that share data blocks of the file until a data block of the file is modified since the time that the snapshot copy was made. In a "write somewhere else" snapshot copy facility, when a block is modified at a particular offset in the logical extent of the file, the offset is re-mapped to a new data block to which the new data is written. The re-mapping of an offset to a new data block is likely to break up the extents of contiguous file system data blocks making up the file's data block organization when the file was in the direct mapping state.

At some time, it may become desirable to convert the file in the indirect mapping state back to a direct mapping. Before this is done, however, certain applications that rely on the UxFS mapping, such as a "write somewhere else" snapshot copy and replication facility, should be shut down. Successful shutdown of the snapshot copy and replication facility is indicated by a "snap count" of not yet replicated snapshot copies of the file becoming zero.

Conversion of the file back to direct mapping occurs in a state 175. In general, this conversion includes a reorganization of the file system blocks in addition to a change in the format of the mapping information for the file, for example, in order to move file data to a limited number of extents of contiguous file system data blocks. A convenient way of doing this reorganization is by migrating all of the file's data blocks to newly allocated data blocks. Once the file has been converted, the file transitions back to the direct mapping state 172.

Figure 10:
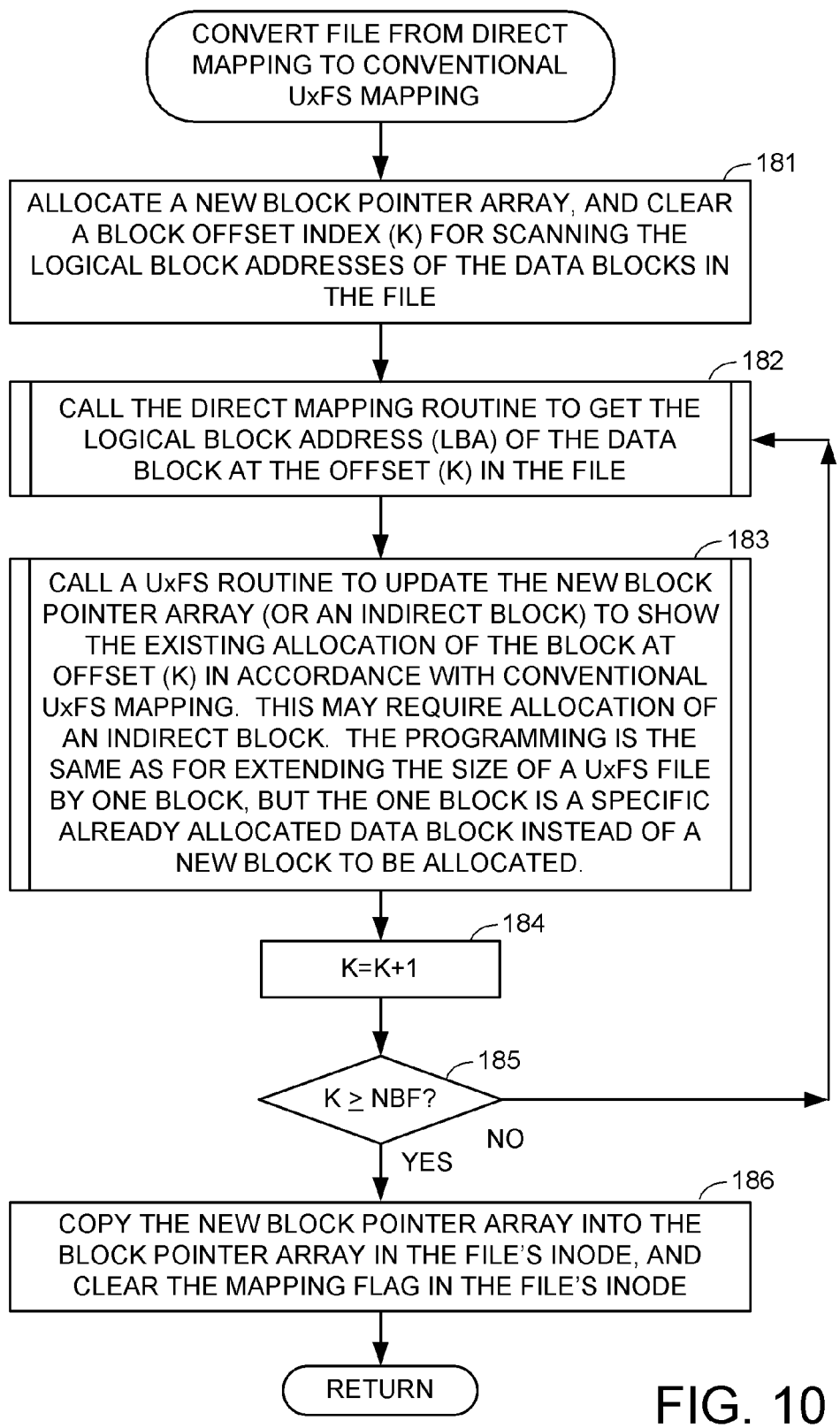
FIG. 10 is a flowchart of a subroutine of the direct/indirect mapping facility for converting the mapping of a file from a direct mapping to the indirect mapping of a UNIX-based file system.

FIG. 10 shows a subroutine of the direct/indirect mapping facility for converting the mapping of a file from a direct mapping to the indirect mapping of a UNIX-based file system. In a first step 181, memory for a new block pointer array is allocated, and a block offset index (K) is cleared for scanning the logical block addresses of the data blocks in the logical extent of the file. In step 182, the direct mapping routine (of FIG. 8) is called to get the logical block address (LBA) of the data block at the offset (K) in the file. In step 183, a UxFS routine is called to update the new block pointer array (or an indirect block) to show the existing allocation of the data block at offset (K) in accordance with the conventional UxFS mapping. For offsets (K) of at least ten, this may require the allocation of at least one indirect block. The programming is the same as for extending the size of a UxFS file by one block, but the one block is a specific already allocated data block instead of a new block to be allocated.

In step 184 the block offset index (K) is incremented by one. In step 185, the block offset index (K) is compared to the number of data blocks (NBF) in the file. If the block offset index (K) is not greater or equal to the number of data blocks (NBF) in the file, then execution loops back to step 182. If the block offset index (K) is greater or equal to the number of data blocks (NBF) in the file, then execution continues to step 186. In step 186, the new block pointer array is copied into the block pointer array in the file's inode, and then the mapping flag is cleared in the file's inode. After step 185, the conversion is done, and execution returns.

Figure 11:
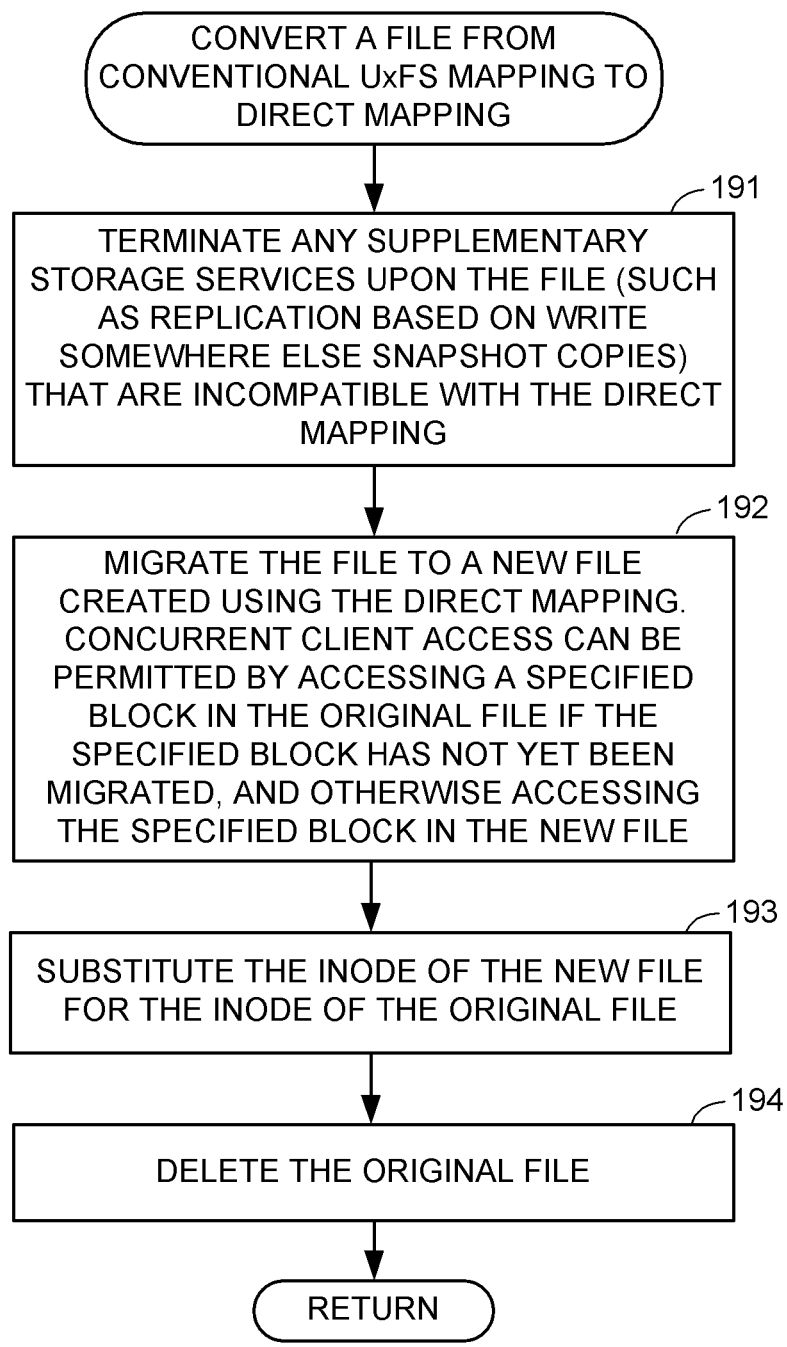
FIG. 11 is a flowchart of a subroutine of the direct/indirect mapping facility for reorganizing a file using the indirect mapping of a UNIX-based file system to convert the file to a direct mapping.

FIG. 11 shows a subroutine of the direct/indirect mapping facility for reorganizing a file using the indirect mapping of a UNIX-based file system to convert the file to a direct mapping. In a first step 191, the direct/indirect mapping facility terminates any supplementary storage services upon the file (such as replication based on write somewhere else snapshot copies) that are incompatible with the direct mapping. In step 192, the file is migrated to a new file using the direct mapping. Concurrent client access can be permitted by accessing a specified block in the original file if the specified block has not yet been migrated, and otherwise accessing the specified block in the new file. For example, a block offset index (K) can be initially set to zero, and used to successively copy each data block of the file to the new file. Upon receipt of the concurrent client access request, the offset specified in the client access request is compared to the block offset index (K) to determine whether or not the block to be accessed has already been migrated. Once the migration has been completed, in step 193, the inode of the new file is substituted for the inode of the original file. In step 194, the original file is deleted. Once step 194 has been completed, the conversion is done, and execution returns.

Figure 12:
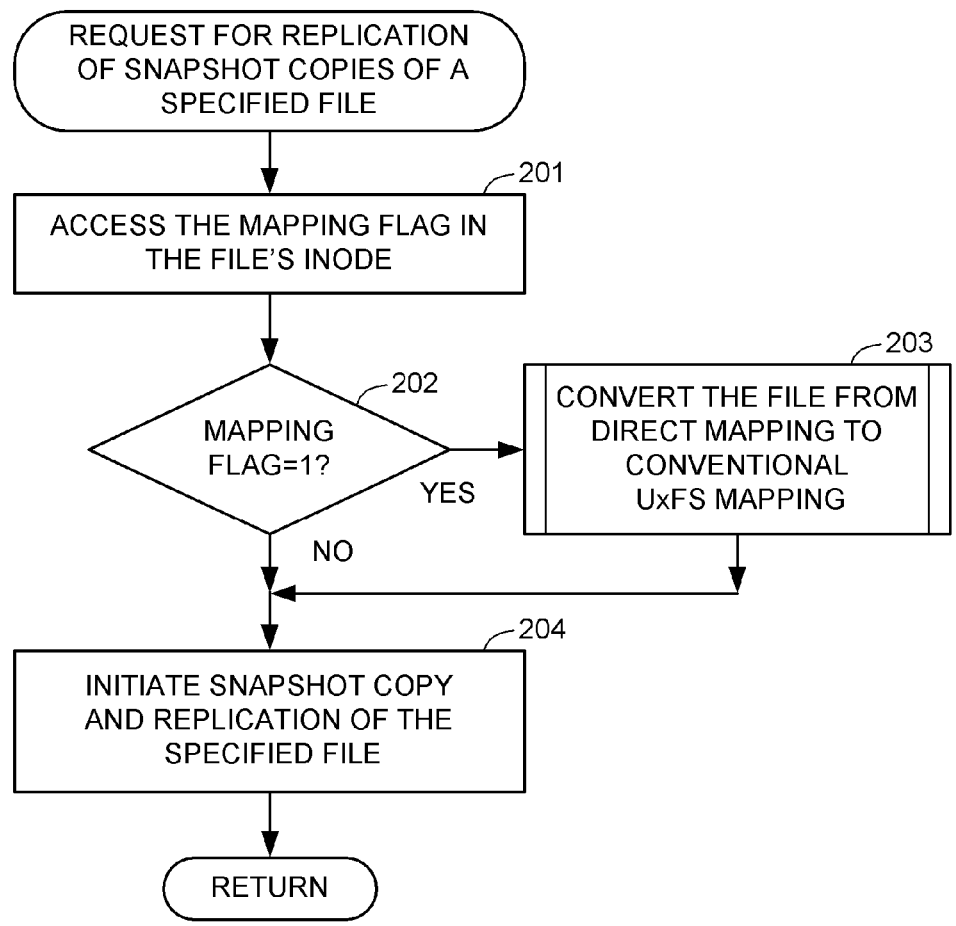
FIG. 12 is a flowchart of a subroutine for responding to a request for snapshot copy and replication of a specified file.

FIG. 12 shows a subroutine in the supplementary storage services for responding to a request for snapshot copy and replication of a specified file. In a first step 201, the mapping flag is accessed in the file's inode. In step 202, if the mapping flag is set, then execution branches to step 203 to call the subroutine of FIG. 10 for converting the file from a direct mapping to a conventional UxFS mapping. Execution continues form step 203 to step 204. Execution also continues from step 202 to step 204 if the mapping flag is not set. In step 204, snapshot copy and replication of the specified file is initiated, and then execution returns.

Figure 13:
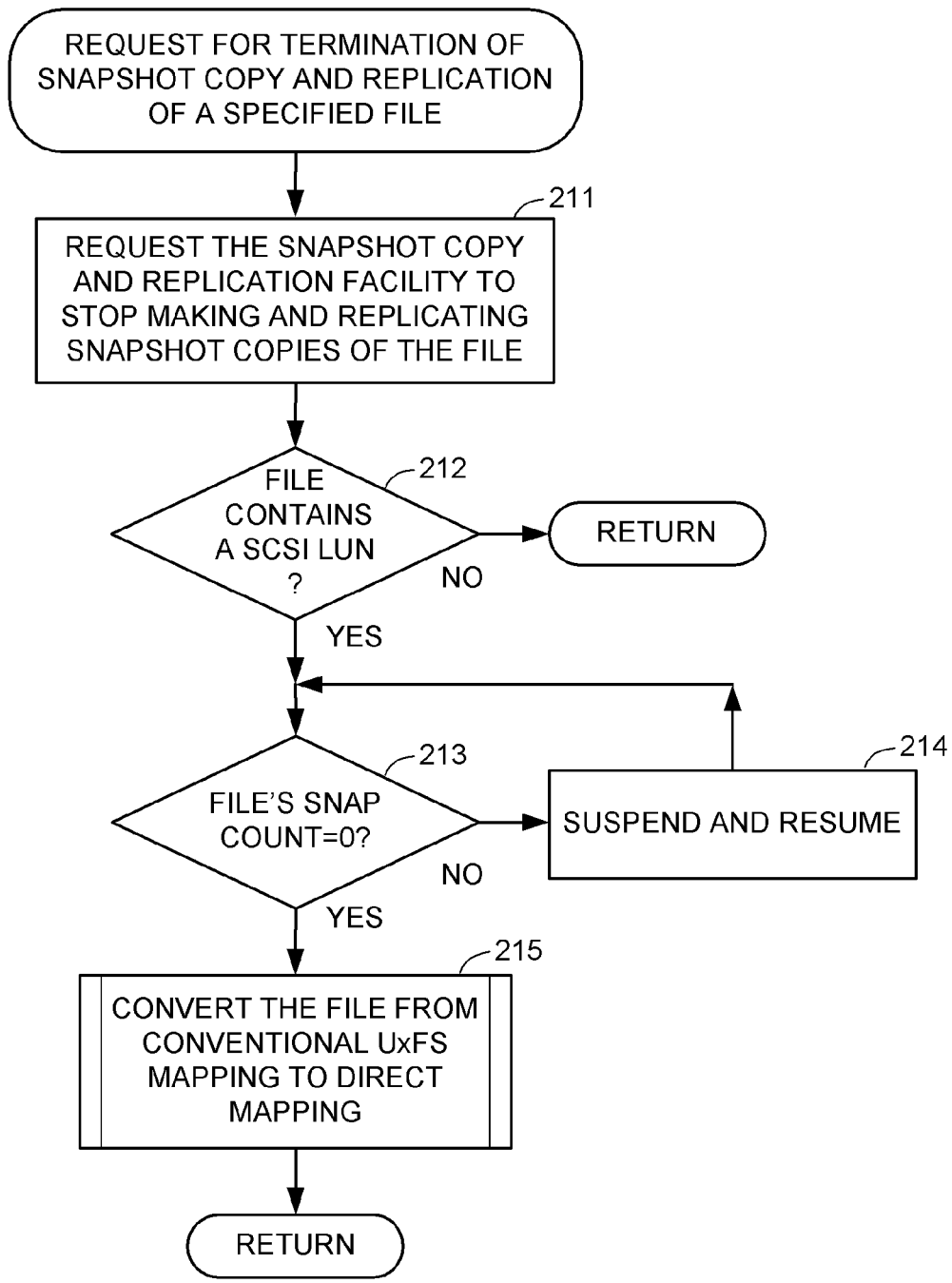
FIG. 13 is a flowchart of a subroutine for responding to a request to terminate snapshot copy and replication of a specified file.

FIG. 13 shows a subroutine of the supplementary storage services for responding to a request to terminate snapshot copy and replication of a specified file. In step 211, the snapshot copy and replication facility is requested to terminate snapshot copy and replication of the file. Next, in step 212, if the file type indicates that the file is not a container for a SCSI LUN (or any other file type that should be direct mapped once snapshot copy and replication of the file is terminated), then execution returns. Otherwise, execution continues from step 212 to step 213. In step 213, if the file's "snap count" of not yet replication snapshot copies of the file is not zero, the execution branches to step 214 to suspend and resume execution. Once the files "snap count" is zero, execution continues from step 213 to step 215. In step 215, the subroutine of FIG. 11 is called to convert the file from the conventional UxFS mapping to direct mapping, and execution returns.

In view of the above, there has been described a method of increasing file access performance when a file does not need functionality enabled by the indirect mapping of a UNIX-based file system, yet providing that functionality when needed. A file is initially created to have metadata and a data block allocation for direct mapping without access to any indirect blocks. Therefore file access performance is increased because the direct mapping eliminates delay otherwise caused by fetching one or more indirect blocks when mapping a specified offset in the logical extent of the file to a data block in the file system. When needed, the functionality enabled by indirect mapping is provided by creating the indirect mapping for the file and then accessing the file using the indirect mapping. When the functionality enabled by the indirect mapping is no longer needed, the file is reorganized to a direct mapping and then accessed using the direct mapping. In this fashion, a file such as a container file for a network attached SCSI LUN is created for direct mapping so that use of the container file does not cause a performance degradation until it is desired for the file to use supplementary storage services that require the functionality provided by the indirect mapping. When it is desired to use such a supplementary storage service, the indirect mapping for the file is created and then the file is accessed using the indirect mapping. Conversion of the file from the direct mapping to the indirect mapping is transparent to the client. For example, when the container file of a SCSI LUN using direct mapping is snapshot copied, the conversion is initiated automatically, and file access is switched seamlessly over to the indirect mapping.

What is claimed is:

1. A method of operating a file server for read or write access to data of a file, the file including multiple data blocks containing data of the file, and the file further including an inode containing metadata of the file, said method comprising:

reading or writing to the file when the file is organized in a direct mapping state in which a logical extent of the file is mapped to the multiple data blocks of the file without access to any indirect block of the file;

converting the file from the direct mapping state to an indirect mapping state by converting mapping information for the file in the direct mapping state to mapping information for the file in the indirect mapping state, the mapping information for the file in the indirect mapping state including at least one indirect block of the file, said at least one indirect block of the file mapping a portion of the logical extent of the file to some of the multiple data blocks of the file; and then reading or writing to the file once the file has been converted from the direct mapping state to the indirect mapping state by accessing said at least one indirect block to obtain mapping information for reading data from or writing data to at least one of the data blocks of the file;

wherein the inode of the file includes a mapping flag indicating whether the file is organized in the direct mapping state or the indirect mapping state, and wherein the method further includes the file server responding to a request for access to a specified offset in the file by accessing the mapping flag to select either a direct mapping procedure for mapping the specified offset to a respective one of the data blocks containing data of the file or an indirect mapping procedure for mapping the specified offset to a respective one of the data blocks containing data of the file.

2. A method of operating a file server for read or write access to data of a file, the file including multiple data blocks containing data of the file, and the file further including an inode containing metadata of the file, said method comprising:

reading or writing to the file when the file is organized in a direct mapping state in which a logical extent of the file is mapped to the multiple data blocks of the file without access to any indirect block of the file;

converting the file from the direct mapping state to an indirect mapping state by converting mapping information for the file in the direct mapping state to mapping information for the file in the indirect mapping state, the mapping information for the file in the indirect mapping state including at least one indirect block of the file, said at least one indirect block of the file mapping a portion of the logical extent of the file to some of the multiple data blocks of the file; and then reading or writing to the file once the file has been converted from the direct mapping state to the indirect mapping state by accessing said at least one indirect block to obtain mapping information for reading data from or writing data to at least one of the data blocks of the file;

which further includes the file server responding to a request for a snapshot copy of the file by checking whether the file is in the direct mapping state, and upon finding that the file is in the direct mapping state, converting the file from the direct mapping state to the indirect mapping state, and then initiating a snapshot copy of the file in the indirect mapping state.

3. A method of operating a file server for read or write access to data of a file, the file including multiple data blocks containing data of the file, and the file further including an inode containing metadata of the file, said method comprising:

reading or writing to the file when the file is organized in a direct mapping state in which a logical extent of the file is mapped to the multiple data blocks of the file without access to any indirect block of the file;

converting the file from the direct mapping state to an indirect mapping state by converting mapping information for the file in the direct mapping state to mapping information for the file in the indirect mapping state, the mapping information for the file in the indirect mapping state including at least one indirect block of the file, said at least one indirect block of the file mapping a portion of the logical extent of the file to some of the multiple data blocks of the file; and then reading or writing to the file once the file has been converted from the direct mapping state to the indirect mapping state by accessing said at least one indirect block to obtain mapping information for reading data from or writing data to at least one of the data blocks of the file;

which further includes the file server responding to a request to terminate a process of making snapshot copies of the file when the file is in the indirect mapping state by checking whether the file is of a type that should be converted back to the direct mapping state upon termination of the process of making snapshot copies of the file when the file is in the indirect mapping state, and upon finding that the file is of a type that should be converted back to the direct mapping state upon termination of the process of making snapshot copies of the file when the file is in the indirect mapping state, converting the file back to the direct mapping state upon termination of the process of making snapshot copies of the file when the file is in the indirect mapping state.

4. A file server comprising:

data storage for storing a file system; and at least one central processing unit coupled to the data storage for providing a client with access to at least one file in the file system, the file including multiple data blocks containing data of the file, and the file further including an inode containing metadata of the file;

wherein said at least one central processing unit is programmed for reading or writing to the file when the file is organized in a direct mapping state in which a logical extent of the file is mapped to the multiple data blocks of the file without access to any indirect block of the file;

wherein said at least one central processing unit is further programmed for converting the file from the direct mapping state to an indirect mapping state by converting the mapping information for the file in the direct mapping state to mapping information for the file in the indirect mapping state, the mapping information for the file in the indirect mapping state including at least one indirect block of the file, said at least one indirect block of the file mapping a portion of the logical extent of the file to some of the multiple data blocks of the file when the file is in the indirect mapping state;

wherein said at least one central processing unit is further programmed for reading or writing to the file once the file has been converted to the indirect mapping state by accessing said at least one indirect block to obtain mapping information for reading data from or writing data to at least one of the data blocks of the file; and wherein the inode of the file includes a mapping flag indicating whether the file is organized either in the direct mapping state or in the indirect mapping state, and wherein said at least one central processing unit is further programmed for responding to a request for access to a specified offset in the file by accessing the mapping flag to select either a direct mapping procedure for mapping the specified offset to a respective one of the data blocks containing data of the file or an indirect mapping procedure for mapping the specified offset to a respective one of the data blocks containing data of the file.

5. A file server comprising:

data storage for storing a file system; and at least one central processing unit coupled to the data storage for providing a client with access to at least one file in the file system, the file including multiple data blocks containing data of the file, and the file further including an inode containing metadata of the file;

wherein said at least one central processing unit is programmed for reading or writing to the file when the file is organized in a direct mapping state in which a logical extent of the file is mapped to the multiple data blocks of the file without access to any indirect block of the file;

wherein said at least one central processing unit is further programmed for converting the file from the direct mapping state to an indirect mapping state by converting the mapping information for the file in the direct mapping state to mapping information for the file in the indirect mapping state, the mapping information for the file in the indirect mapping state including at least one indirect block of the file, said at least one indirect block of the file mapping a portion of the logical extent of the file to some of the multiple data blocks of the file when the file is in the indirect mapping state;

wherein said at least one central processing unit is further programmed for reading or writing to the file once the file has been converted to the indirect mapping state by accessing said at least one indirect block to obtain mapping information for reading data from or writing data to at least one of the data blocks of the file; and wherein said at least one central processing unit is further programmed for responding to a request for a snapshot copy of the file by checking whether the file is in the direct mapping state, and upon finding that the file is in the direct mapping state, converting the file from the direct mapping state to the indirect mapping state, and then initiating a snapshot copy of the file in the indirect mapping state.

6. A file server comprising:

data storage for storing a file system; and at least one central processing unit coupled to the data storage for providing a client with access to at least one file in the file system, the file including multiple data blocks containing data of the file, and the file further including an inode containing metadata of the file;

wherein said at least one central processing unit is programmed for reading or writing to the file when the file is organized in a direct mapping state in which a logical extent of the file is mapped to the multiple data blocks of the file without access to any indirect block of the file;

wherein said at least one central processing unit is further programmed for converting the file from the direct mapping state to an indirect mapping state by converting the mapping information for the file in the direct mapping state to mapping information for the file in the indirect mapping state, the mapping information for the file in the indirect mapping state including at least one indirect block of the file, said at least one indirect block of the file mapping a portion of the logical extent of the file to some of the multiple data blocks of the file when the file is in the indirect mapping state;

wherein said at least one central processing unit is further programmed for reading or writing to the file once the file has been converted to the indirect mapping state by accessing said at least one indirect block to obtain mapping information for reading data from or writing data to at least one of the data blocks of the file; and wherein said at least one central processing unit is further programmed for responding to a request to terminate a process of making snapshot copies of the file when the file is in the indirect mapping state by checking whether the file is of a type that should be converted back to the direct mapping state upon termination of the process of making snapshot copies of the file when the file is in the indirect mapping state, and upon finding that the file is of a type that should be converted back to the direct mapping state upon termination of the process of making snapshot copies of the file when the file is in the indirect mapping state, converting the file back to the direct mapping state upon termination of the process of making snapshot copies of the file when the file is in the indirect mapping state.

* * * * *